United States Patent [19]

Melcher

[11] Patent Number: 4,510,709

[45] Date of Patent: Apr. 16, 1985

[54] FISHING ROD HOLDER WITH BITE SIGNALING MEANS

[76] Inventor: Alton R. Melcher, 40262 Santa Teresa Common, Fremont, Calif. 94539

[21] Appl. No.: 532,453

[22] Filed: Sep. 15, 1983

[51] Int. Cl.³ .............................................. A01K 97/12
[52] U.S. Cl. .......................................... 43/17; 43/21.2
[58] Field of Search .............................. 43/17, 16, 21.2

[56] References Cited

U.S. PATENT DOCUMENTS

| | | | |
|---|---|---|---|
| 3,645,028 | 2/1972 | Rayburn | 43/17 |
| 3,874,107 | 4/1975 | Wheaton | 43/17 |
| 4,154,015 | 5/1979 | Holland | 43/17 |
| 4,240,221 | 12/1980 | Komarnicki | 43/17 |

Primary Examiner—Nicholas P. Godici
Assistant Examiner—C. McKee
Attorney, Agent, or Firm—Linval B. Castle

[57] ABSTRACT

A fishing rod holder in which a rod is supported in a butt socket and a yoke on the end of a resilient strap attached at the other end to the top surface of a rectangular tubular housing formed of two channel members. A push switch in the housing and extending out to contact the inner surface of the resilient strap is closed whenever the yoke is moved inward by a fish strike of suitable magnitude, and an audible alarm or a lamp is selectively energized to indicate the fish strike. A novel sensitivity control in the system includes a threaded screw insertable in one of several threaded holes through the housing between the end of the housing and the point of attachment of the resilient strap so that adjustment of the screw on a desired position can accurately control the sensitivity of the alarm. Another feature is the inclusion of a remote alarm circuit that enables the angler to use the rod holder and alarm from a shelter or remote location.

12 Claims, 4 Drawing Figures

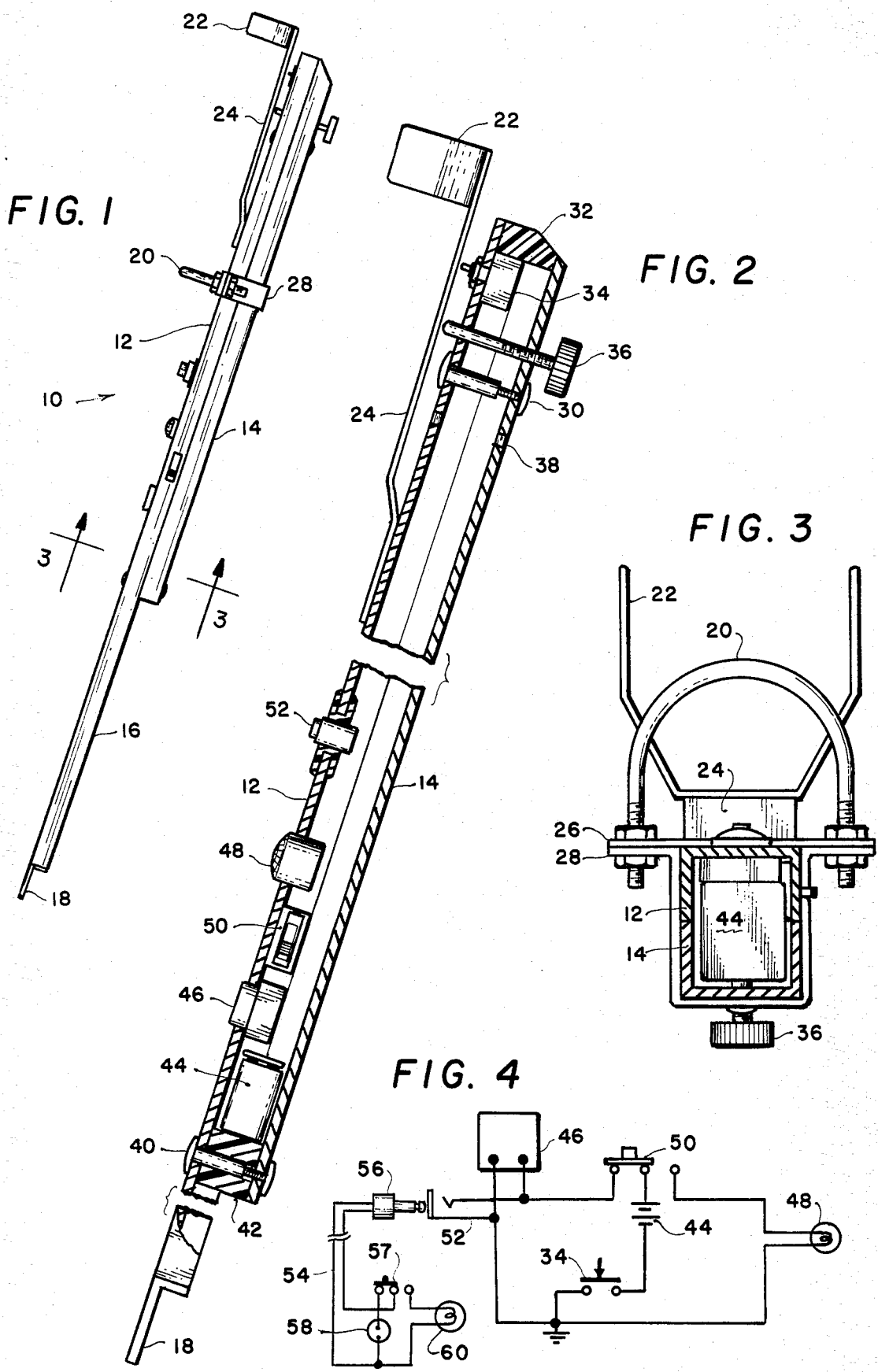

FISHING ROD HOLDER WITH BITE SIGNALING MEANS

BRIEF SUMMARY OF THE INVENTION

This invention relates generally to fishing rod holders and particularly to a novel rod holder with adjustable means for presenting a visual and/or audible alarm upon occurance of slight movements of the rod caused by movement of the bait.

There are many different types of fishing rod holders, some with various types of sensing devices for signaling a bite. Some of these sensing devices respond to a slight pull on the fishing line, some respond to movement of the rod itself. Generally, the type that responds to rod movement are activated by an electrical switch which, when closed by some movement of the rod in the holder, activates a battery operated sound generator to alert the fisherman.

The rod holder of the invention is the type that responds to rod movement to close an electrical switch that selectively activates either a sound generator or a light. The rod holder contains both the sound generator and alarm light, and is also provided with a jack into which a long extension cord may be plugged to sound an audible or show a visible alarm at a location remote from the rod holder. The visual alarm light, either on the rod holder or at a remote location, is most important for night fishing where the rod itself cannot readily be seen. Both the audible and visual alarms are also important in fishing for such fish as sturgeon since even very large sturgeon strike a bait very gently and, without a very sensitive alarm such as that in the rod holder of the invention, requires a careful and constant surveillance of the rod tip by a successful fisherman. The remote audible and visual alarm is also important when fishing during cold or inclement weather when the prudent fisherman finds shelter.

Briefly described, the rod holder of the invention includes a pair of metal channel members clamped together to form a square tubular housing which contains a battery, a small audible alarm, a lamp and holder, an audio-visual selector switch, and a jack for connecting to a remote audio-visual alarm unit. One channel member, being longer than the second member, is sharpened at the lower end to form a sand or ground spike for supporting the holder. Near the opposite or upper end of the clamped members is a longitudinally adjustable socket for holding a rod butt, and a yoke extending upward and outward from the upper end of the clamped members provides a second support for the rod. The yoke is attached to one end of a resilient metal strap, the opposite end of which is secured to the top member, above the adjustable socket, about eight inches from the end of the member. At the end of the top member is a push type switch that is closed by downward pressure on the yoke to activate the alarm, and an adjustable thumbscrew located in one of a plurality of threaded holes through the members and bearing against the bottom of the resilient yoke supporting strap may be adjusted to accurately control the sensitivity of the alarm.

BRIEF DESCRIPTION OF THE DRAWINGS

In the drawings which illustrate the preferred embodiment of the invention:

FIG. 1 is a side elevation view of the fishing rod holder with bite alarm means;

FIG. 2 is a sectional view illustrating the component parts of the rod holder;

FIG. 3 is an end view taken along the lines 3—3 of FIG. 1; and

FIG. 4 is an electrical schematic of the alarm circuitry in the rod holder and the remote alarm circuitry.

DETAILED DESCRIPTION

FIG. 1 is a side elevation view of the rod holder and illustrates it at approximately the correct angle in which it would be positioned to support a fishing rod. The holder 10 is preferably formed of two metal channel members 12 and 14 with channels facing each other to form a rectangular tubular housing in which the various components of the holder and strike alarm are housed, as will be subsequently described in detail. The channel member 12 is substantially longer than the member 14 and the lower section 16 of the member 12 that is not in contact with the member 14 has a sharpened end or tip 18 so that the rod holder may be driven into the shoreline sand to support the rod in an upright position. While not illustrated in the drawings, the lower section 16 may be provided with a clamping member so that the rod holder may be attached to the rails of a boat, pier or wharf, as desired.

The upper end of the rod holder 10 supports a fishing rod. The rod butt is seated into a socket 20, as illustrated in detail in the drawing of FIG. 3 and the rod itself rests in a U-shaped yoke 22 that is attached to one end of a resilient strap 24, the second end of which is rigidly connected to the top surface of the channel member 12 as best illustrated in FIG. 2. The rod butt socket 20 is preferably formed by a U-bolt, each end of which passes through aligned holes in a surface strap 26 and a peripheral strap 28 which respectively lie across the top of the joined channel members 12, 14 and around the sides and bottom of the members. The nuts on the U-bolt may be loosened to both adjust the size of the rod butt socket 20 and also to slide the socket along the joined members to adjust the spacing between the socket 20 and the yoke 22. In the preferred embodiment, the socket 20 may be adjusted to be at any position between eight and fourteen inches from the yoke 22 to adapt the holder to a side variety of fishing rods.

FIG. 2 is an enlarged sectional view of the holder of FIG. 1 and illustrates the lower end or tip 18 of the channel member 16, a central section of the joined channel members containing various electronic components to be described, and the upper end of the joined members which contains an electrical switch, sensitivity adjustment screw and the yoke 22 attached to the top surface of the upper end by the resilient strap 24.

The two channel members 12, 14 are clamped together at the upper end by a convenient screw fastener 30, such as the Chicago fastener illustrated in FIG. 2, to form a rectangular housing. A suitable end plug 32 of plastic, rubber, or wood seals the end of the open housing to prevent moisture from entering the bore of the housing and a normally "off" single-pole push switch 34 is positioned in the top surface of the member 12 adjacent the end plug 32. As shown in FIG. 2 the activating rod of the switch extends from the surface of the member 12 so that pressure against the yoke 22 and a corresponding movement of the resilient strap 24 will cause the strap to contact the activating rod and close the switch, the operation of which will be subsequently described.

An important feature of the fishing rod holder is a sensitivity adjustment which accurately controls the force required to close the switch 34. This sensitivity is adjusted by a threaded knurled headed screw 36 that extends through both members 12, 14 forming the housing and contacts the inner surface of the resilient strap 24. The screw may be threaded through holes near the switch 34, as shown in FIG. 2, for control of the sensitivity of relatively "heavy" fishing rod activity, or may be threaded through one or more different holes through the housing that are located further from the switch 34, such as the threaded hole 38, for light fishing rods or to detect very light bites or strikes such as is typical for sturgeon that may weigh several hundred pounds. Thus, the sensitivity adjustment in the fishing rod holder is controlled by the position of the screw 36 in the housing and also by the amount the sensitivity screw extends toward the resilient strap 24. For maximum sensitivity for very light rod activity, the screw 36 is adjusted so that the resilient strap 24 will activate the switch without any contact against the end of the screw.

As illustrated in FIG. 2, the central section of the housing contains the electrical components that respond to the closing of the switch 34 discussed above, and FIG. 4 is an electrical schematic diagram of the circuitry containing the components of FIG. 2. The channel members 12, 14 forming the housing are screwed together by the screw 40 which is moisture sealed by the end plug 42. Adjacent the plug 42 within the housing is a battery 44 for powering a small audible alarm 46 or a lamp alarm 48. Positioned in the side surface of the channel member 12 is a single-pole double-throw audio/visual selector switch 50, and in the top surface of the member 12 is a suitable mounted jack 52 which may be used either to connect an extension line to a remote audio/visual alarm, or to couple a loud electrical horn that may be heard at a distance.

FIG. 4 is the electrical schematic diagram illustrating the connection of the components of FIG. 2. One terminal of the switch 34 is coupled to one terminal of the battery 44, the second terminal of which is connected to the center arm of the double-throw audio/visual selector switch 50. One side contact of the switch 50 is connected through the lamp 48 to a common conductor and to the second side of the switch 34, and the second contact of the selector switch 50 is coupled to one terminal of the audible alarm 46 the second terminal of which is connected to the common conductor. The jack 52 is coupled in parallel with the audible alarm, as illustrated.

FIG. 4 also illustrates the circuitry for a remote alarm which is convenient in situations where the fisherman may wish to take shelter or to be at some location other than that of the fishing rod holder. A electrical extension wire pair connected to at one end to a plug 56 operable with the jack 52 is coupled at the other end to a single-pole double-throw audio/visual selector switch 56 which, in one position couples the extension wire pair across an audible alarm 58, and in the second position couples the wire pair across a lamp or visible alarm 60, as shown. Therefore, if the audio/visual selector switch 50 in the housing is thrown to the audible alarm position, the remote alarm on the extension wire pair 54 may be operated to either sound an alarm or to show a visible alarm whenever a fishing rod mounted in the rod holder is caused to exert sufficient force against the yoke 22 and the resilient strap 24 so that the strap will close the switch 34.

Having thus described my invention, what is claimed is:

1. A fishing rod holder with bite signalling means comprising:
   an elongated tubular housing having moisture sealing means in first and second ends thereof and at least one outer side surface;
   a generally U-shaped fishing rod supporting yoke connected to the outer surface of an elongated resilient strap having an inner and outer surface, said yoke being connected at the first end of said strap, the second end of said strap being connected to the housing outer side surface at a location that extends said yoke adjacent and beyond the first end of said housing, said strap being substantially parallel with said housing side surface with the inner surface thereof facing said housing side surface;
   an electrical switch mounted within said tubular housing having switch closing means extending from said outer housing side surface, said closing means being located adjacent said housing first end and positioned to contact the inner surface of said strap;
   electrical alarm means mounted within said tubular housing responsive to a closing of said electrical switch; and
   sensitivity adjustment means including an adjustable screw extending from said outer housing side surface and located in one of a plurality of threaded holes through said housing between the first end thereof and the point of connection of said elongated resilient strap to said side surface, the end of said screw extending from said side surface being adjustable to contact the inner surface of said strap.

2. The fishing rod holder claimed in claim 1 wherein said alarm means includes a selectively operable audible alarm and visual alarm.

3. The fishing rod holder claimed in claim 2 wherein said visual alarm is a lamp.

4. The fishing rod holder claimed in claim 2 further including a selector switch in said housing for selecting said audible and said visual alarm.

5. The fishing rod holder claimed in claim 2 further including a jack mounted in said housing and electrically connected in parallel with said audible alarm for coupling said alarm means to a remote audio/visual alarm.

6. The fishing rod holder claimed in claim 5 wherein said remote audio/visual alarm includes a plug insertable into said jack, an electrical wire pair connected to said plug, and a selectable audible and visible alarm coupled to the opposite end of said wire pair.

7. The fishing rod holder claimed in claim 2 further including a fishing rod butt socket coupled to and adjustable along said housing for accomodating different sizes of fishing rods.

8. The fishing rod holder claimed in claim 7 wherein said rod butt socket is a U-bolt adjustably mounted in strapping means around the periphery of said housing and slideable along the length thereof.

9. The fishing rod holder claimed in claim 7 further including means at the second end of said housing for supporting said housing and a fishing rod in said butt socket and said yoke at a desired angle of elevation.

10. The rod holder claimed in claim 9 wherein said supporting means is a sharpened sand spike.

11. The rod holder claimed in claim 1 wherein said housing comprises first and second channel members clamped together to form a rectangular tubular housing.

12. The rod holder claimed in claim 9 wherein said housing comprises first and second channel members clamped together, and wherein said housing supporting means includes an extension on the second end of said first channel member, said extension having a sharpened end for spiking into the earth to support said housing.

* * * * *